United States Patent [19]

Labarre

[11] E Re. 29,850

[45] Reissued Nov. 28, 1978

[54] CLOSURE SPOUT HAVING TEAR-OUT PORTION

[75] Inventor: Maurice Labarre, Boulogne-sur-Seine, France

[73] Assignee: Breskin Industries Corp., White Plains, N.Y.

[21] Appl. No.: 842,697

[22] Filed: Oct. 17, 1977

Related U.S. Patent Documents

Reissue of:

[64] Patent No.: 3,459,315
Issued: Aug. 5, 1969
Appl. No.: 706,296
Filed: Feb. 19, 1968

[30] Foreign Application Priority Data

Feb. 21, 1967 [FR] France ..... 67.95797

[51] Int. Cl.[2] ..... B65D 47/10

[52] U.S. Cl. ..... 222/541; 215/253; 215/295

[58] Field of Search ..... 222/541, 562, 189, 525; 215/253, 295, 307, 346, 100 A, 354; 220/94 A, 270

[56] References Cited

U.S. PATENT DOCUMENTS

| | | | |
|---|---|---|---|
| 2,895,654 | 7/1959 | Rieke | 220/94 X |
| 3,099,361 | 7/1963 | Ruetz | 215/345 |
| 3,135,441 | 6/1964 | Wise et al. | 222/541 |
| 3,269,617 | 8/1966 | Goth | 215/31 X |

*Primary Examiner*—George T. Hall
*Attorney, Agent, or Firm*—Lawrence Rosen; E. Janet Berry

[57] ABSTRACT

A closure of injection-moulded synthetic plastic material for a bottle or other receptacle, such closure comprising a tubular body having a throat insertable into the neck of the bottle and an integral fluid-tight diaphragm across the throat with an external gripping device by which the diaphragm can be torn off, wherein the gripping device is a ring separate from the watertight diaphragm but joined to the rim of the latter by means of a base connection which is also integrally moulded. The closure has an integrally moulded pouring spout, and a replaceable cap protecting the spout.

7 Claims, 4 Drawing Figures

CLOSURE SPOUT HAVING TEAR-OUT PORTION

Matter enclosed in heavy brackets [ ] appears in the original patent but forms no part of this reissue specification; matter printed in italics indicates the additions made by reissue.

This invention relates to pouring closures or distributor closures, injection moulded in synthetic plastics material and for use in particular on the neck of a bottle or other receptable, for example in order to extend the mouth of the bottle by a pouring rim or spout, the mouth of the bottle before use being sealed by a watertight diaphragm moulded integrally with the closure.

Pouring closures of this kind are already known in which the membrane can be torn off by means of an external gripping device, which is integrally moulded with the outer surface of the membrane, and extends as a circle above the rim of the membrane near the pouring edge or spout. In these known pouring closures the gripping device is a tongue or tab. One end of the tab extends from the outer surface of the membrane and forms a circle or spiral above the rim of the membrane. The other end of the tab, that is to say the free end, projects slightly above the edge of the pouring rim or spout.

In this already known arrangement the membrane is torn off by pulling the free end of the tab. However, particularly if manufacturing tolerances have been exceeded, the tab itself can easily be torn, particularly where it is attached to the membrane, so that the membrane itself is not torn off. Furthermore, in these already known pouring closures the rim of the membrane is joined to the internal wall of the throat of the closure by a very thin ring which is so arranged that its thinnest part extends in a plane parallel to the plane of the membrane. The resulting effect is that that thickness of the rupture ring, that is to say the thickness of the rupturing part of the ring, this thickness determining the ease with which the membrane can be torn off, depends on the width of the gap which is left in practice between the two parts of the injection mould during the process of injection.

The injection mould consists of two parts, a stationary part and a mobile part, which are locked together before injection begins. The precision of the thickness of the rupturing part of the rupture ring varies slightly with the precision with which the contacting faces of the two parts of the mould are held in contact with each other, and this depends on the precision of functioning of the locking device which locks the two parts of the mould together, and depends also on the injection pressure, which tends to force the two halves of the mould apart. Although the rupture thickness of the ring can be kept to the specified thickness within fairly narrow limits, nevertheless the variation in thickness, between one ring and another, is enough to result in a high percentage of rings whose rupture thickness is too great or too little. If the rupture thickness is too great it becomes difficult to tear the membrane off, and if the rupture thickness is too little the membrane can become detached inadvertently.

The pouring closure or distributor closure according to the present invention is of the general type mentioned above, but it is so constructed that it is free from the faults already mentioned of the known pouring closures.

The pouring or distributing closure according to the invention is characterised by the following features taken singly or preferably in combination:

(a) The gripping device is a ring projecting from the membrane and joined to the rim of the membrane by one, or preferably by several, bases, all these parts being integrally moulded. In a preferred version of the invention the gripping ring is interrupted or slit and its two ends are joined by two short bases to the rim of the membrane at two points, preferably next to each other.

(b) The periphery of the watertight membrane is joined to the internal wall of the throat of the closure by a very thin ring which extends perpendicularly with respect to the plane of the membrane and parallel to the direction of closing of the injection mould.

The first characteristic mentioned above ensures that the gripping device of the closure according to the present invention always has a rupture strength higher than that of the very thin ring which joins the rim of the watertight membrane to the internal wall of the throat of the closure. This high tensile strength in the gripping device is ensured by the fact that the applied pull is transmitted to the membrane through the two bases being situated on either side of the location on the gripping ring where the pull is applied. There are preferably at least two of these bases joined to the rim of the membrane at different locations whereas, in the already known pouring closure, the tension of the pull passes through only a single part, this being the single tongue or tab whose free end is gripped by the operator, the pull being applied to only a single location on the rim of the membrane. Furthermore, the gripping ring of the closure according to the present invention is less likely to get caught or jammed before the membrane is torn off, in the course of manipulation of the closure and receptacle, because the gripping ring according to the invention has no free end, as have the grips or tabs of the hitherto known pouring closures.

The second characteristic mentioned above ensures that in the two parts of the injection mould, the stationary and the mobile parts, the surfaces forming the gap which determines the thickness of the rupture ring extend at right angles to the plane of the membrane, and therefore extend parallel to the direction of movement of the mobile part of the mould relative to the stationary part. Consequently the width of the gap between these surfaces, and therefore the thickness of the molded rupture ring, is independent of the moulding conditions, that is to say independent of the precision of functioning of the locking device which locks the two parts of the mould together before injection.

The width of the gap which determines the thickness of the rupture ring is also independent of the injection pressure used during the moulding operation. The thickness of the rupture ring depends only on the precision of centering of the two parts of the mould, with respect to each other, and this quantity can easily be held to close tolerances. The practical advantage obtained in this way is that the pull required to tear the membrane out of the closure made according to the present invention is practically independent of injection press adjustment, particularly wear on certain parts of the mould locking device, and also warping of the mould.

There will now be described by away of example, with reference to the diagrammatical drawings, several versions of the closure according to the invention.

Figure 1:
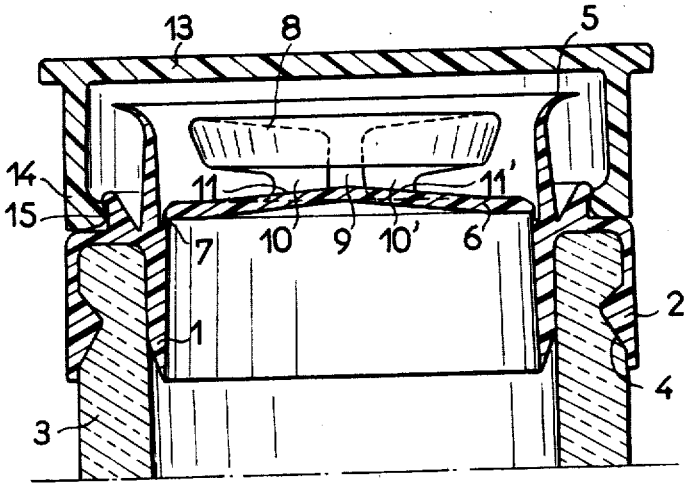
FIGS. 1 and 2 are axial sections of a pouring closure according to the invention, FIG. 1 being a vertical sectional view and FIG. 2 a perspective view. These figures clearly illustrate the shape and arrangement of the gripping ring.
Figure 2:
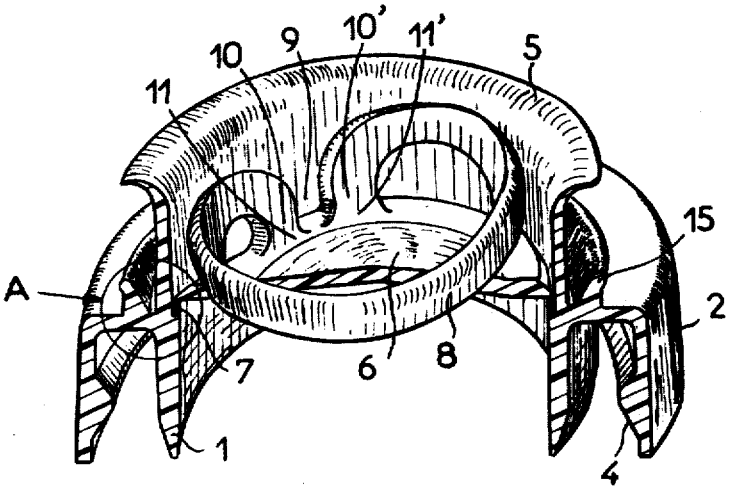
Figure 3:
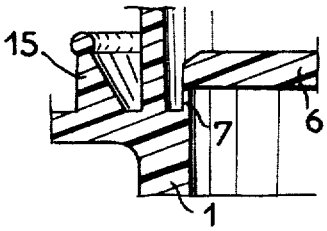
FIG. 3 shows the detail A of FIG. 2, drawn to a larger scale.

The version of the pouring closure according to the invention shown in FIGS. 1 to 3 consists essentially of a single injection moulding of a synthetic plastics substance, for example polyethylene. The closure comprises the following parts, all integrally moulded.

A cylindrical throat 1 has an external diameter only slightly greater than the internal diameter of the mouth of the bottle or receptacle for which it is intended. In use the closure is mounted on the bottle by introducing the throat 1 of the closure into mouth 3 of the bottle or receptacle. The closure is locked to the mouth of the bottle or receptacle by an annular skirt 2 which concentrically surrounds the lower part of the throat 1 of the closure. The skirt 2 engages around the outside of the bottle mouth, as shown in FIG. 1. The skirt 2 of the closure has an internally projecting locking ring 4, which engages in an external groove in the neck 3 of the bottle or receptacle. The closure is mounted on the bottle or receptacle by forcing it on to such neck.

The upper part of the pouring closure is in the form of an outwardly curving pouring spout 5, which acts as a continuation of the neck 3 of the bottle or receptacle. The pouring spout is preferably very short, at most 1.5 mm. long, as shown in FIGS. 1 and 2, and it can be manufactured by injection moulding to very small tolerances.

About halfway up in the throat of the pouring closure there is a watertight transverse membrane 6, which is moulded as an integral extension of the internal wall of the throat 1. The membrane 6 is connected to the throat 1 by a very thin ring 7. The thickness of the ring 7 is much less than the thickness of the membrane 6. This is shown clearly in FIG. 3, which is drawn to a larger scale. As will be seen from this figure, the axial section of the rupture ring 7 is essentially rectangular in shape. The longer sides of the rectangle occupy planes essentially perpendicular to the plane of the membrane 6 (that is to say they extend in the direction of the thickness of the membrane 6), whereas the shorter sides of the rectangle extend parallel to the plane of the membrane 6 (this being the plate of rupture of the rupture ring 7). Thus in this example of the pouring closure according to the invention the peripheral edge of the membrane 6 is joined to the internal wall of the throat 1 by a cylindrical plastic collar 7 whose side walls are coaxial with the throat 1, the thickness of the cylindrical collar 7 being much less than its height and much less than the thickness of the membrane 6.

It is not, however, essential to the invention to have the collar 7 extending inwards, towards the interior of the receptacle, from the surface of the diaphragm 6. All that is necessary is that the collar 7 must extend in the direction of closing of the injection mould, a direction which is usually perpendicular to the plane of the diaphragm 6. The requirement is that it must be possible to mould the rupture collar 7 in a mould whose two parts, the one mobile and the other stationary, have surfaces parallel to the direction of movement of the mobile part of the mould spaced apart to leave a gap of precise width in which the collar 7 is moulded, so that the thickness of the collar is a precise and determined quantity independent of the moulding conditions, that is to say independent of the precision of functioning of the locking device which locks the two parts of the mould together, and independent of the injection pressure, so that the moulded rupture ring 7 always has exactly the same thickness to a close tolerance, in order to ensure that the ring always ruptures under optimal conditions.

The diaphragm 6 is also equipped, on its outer surface that is to say on its surface nearest to the pouring rim 5, with a gripping ring or tear-member 8, which extends in an arc of a circle above the rim of the diaphragm 6, near the pouring edge 5. In the version shown here the gripping ring 8 is interrupted at 9, its two ends being joined to the short bases 10 and 10′ which merge at 11 and 11′ with the membrane 6, all these parts being formed integrally during the moulding operation. The points 11 and 11′ are preferably situated next to each other, as shown in the drawing. Alternatively, however, the gripping ring 8 can if desired be in the form of a closed ring joined to one, or preferably two, bases which merge into the rim of the membrane 6, all these parts being formed integrally during the moulding.

In the version of the invention illustrated in FIGS. 1 to 3, the internal surfaces of the gripping ring and of the bases 10 and 10′ are part of a cylindrical surface coaxial with the closure, to allow easy removal of the closure from the mould, and to simplify the design of the mould.

The bottle of liquid, for example oil, sealed by the pouring closure according to the invention, as described above, is intended to be sold on the market equipped preferably with an outer cap. This is also an injection moulding, for example as illustrated in FIG. 1 at 13. The cap is forced on to the pouring closure, lower inturned rim 14 of the cap engaging with an annular rim 15 of the throat 1 of the pouring closure. The rim 15 is also integrally moulded with the closure. After the receptacle has been opened, by tearing off the diaphragm 6 by means of the gripping ring 8, the cap 13 is replaced to form a temporary protective closure.

The pouring closure according to the invention is not limited to the versions described above, but can be modified in various ways without departing from the scope of the invention. These modifications, some of which have been indicated above, can be applied to different parts of the pouring closure. In particular, the outwardly curved pouring rim can be replaced by a pouring spout of any known or appropriate kind.

Furthermore, the means for locking the closure on the neck of the bottle can be other than shown here. In particular, the pouring closure can be screwed to the neck of the receptacle. The watertight diaphragm need not be situated halfway up in the throat of the closure since it can, if desired, be near the top. Finally, the means for locking the outer cap to the pouring closure can be of various kinds. In particular the cap can be screwed to the closure, or the cap can be forced into engagement inside the upper part of the pouring rim, between the inner surface of the pouring rim and the gripping ring.

Figure 4:
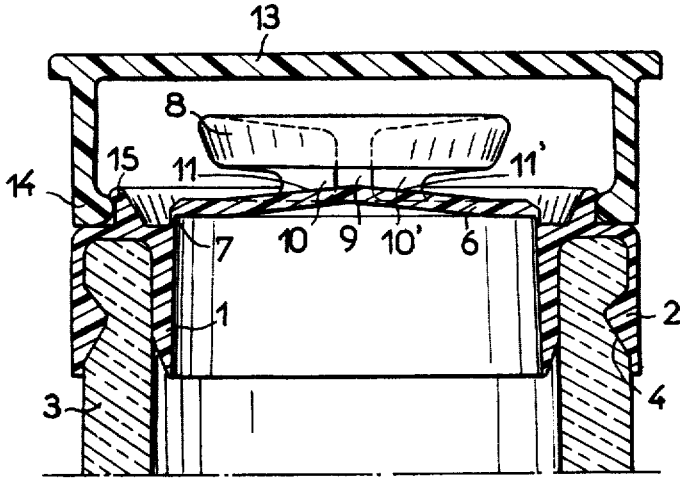
FIG. 4 is a vertical sectional view of an alternative distributor closure according to the invention.

The distributor closure shown in FIG. 4, where corresponding parts have been given the same index numbers as in FIGS. 1 to 3, is intended for use in the mouth of a flask or box containing pills, granular material or a powder. This closure differs from the one shown in FIGS. 1 to 3 only in that it has no pouring rim or spout 5. Moreover, in this case the watertight diaphragm may be mounted on the outer rim of the throat.

I claim:

[1. A molded plastic integral pouring closure for a container comprising, a tubular body comprising a throat portion insertable into the neck of the container and a skirt spaced from and outwardly of said throat portion integrally connected thereto for disposition circumferentially of the neck of the container, an extension of said throat defining a pouring spout, a sealing diaphragm transversely of said throat closing said throat portion, a tear-member connected to said diaphragm adjacent an edge thereof and disposed internally of said spout and spaced from said diaphragm, said tear-member comprising an arcuate portion for pulling thereon for tearing out the diaphragm, and means integrally connecting said tear-member to said diaphragm.]

2. A molded plastic integral pouring closure according to claim [1] 6, including a removable protective cap mounted on said closure skirt enclosing said spout.

3. A molded plastic integral pouring closure according to claim [1] 6, in which said arcuate portion of said tear-member is substantially flush with an edge defining the mouth of said pouring spout.

[4. A molded plastic integral pouring closure according to claim 1, in which said tear-member comprises a split ring.]

5. A molded plastic integral pouring closure according to claim [1] 6, in which said tear-member comprises a ring.

*6. A molded plastic integral pouring closure for a container comprising a tubular body having a throat portion insertable into the neck of a container and a skirt spaced from and outwardly concentric of said throat portion integrally connected thereto for disposition circumferentially of the neck of the container, an extension of said throat defining a pouring spout, a sealing diaphragm extending transversely across the throat opening closing same, a tear-member connected to said diaphragm adjacent an edge thereof and disposed internally of said spout, said tear-member being substantially ring-shaped and having a closed arcuate portion thereof disposed in spaced substantially parallel relation to said diaphragm so as to thereby be adapted for pulling thereon for tearing out the diaphragm, said tear-member being integrally connected to said diaphragm at at least two closely adjacent points thereof.*

*7. A molded plastic integral pouring closure according to claim 6, in which said tear-member comprises a split ring, a pair of base members being integral with said diaphragm and joined to the ends of said split ring.*

*8. A molded plastic integral pouring closure according to claim 6, including a rupture ring member extending substantially perpendicular to the plane of said diaphragm and connecting said diaphragm to the said throat portion.*

*9. A molded plastic integral pouring closure according to claim 8, in which the thickness of said rupture ring is less than the thickness of said diaphragm.*

* * * * *